(12) United States Patent

Jin et al.

(10) Patent No.: US 12,578,943 B2

(45) Date of Patent: Mar. 17, 2026

(54) TRANSLATION QUALITY ASSURANCE BASED ON LARGE LANGUAGE MODELS

(71) Applicant: International Business Machines Corporation, Armonk, NY (US)

(72) Inventors: Yuan Jin, Shanghai (CN); Xi Xi Liu, Shanghai (CN); Li ping Wang, Shanghai (CN); Brian Robert Matthiesen, Cary, NC (US); Wei Sun, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 18/528,866

(22) Filed: Dec. 5, 2023

(65) Prior Publication Data

US 2025/0181335 A1 Jun. 5, 2025

(51) Int. Cl.
*G06F 9/44* (2018.01)
*G06F 8/51* (2018.01)

(52) U.S. Cl.
CPC ...................................... *G06F 8/51* (2013.01)

(58) Field of Classification Search
CPC ......................................................... G06F 8/51
See application file for complete search history.

(56) References Cited

U.S. PATENT DOCUMENTS 10,467,349 B2 * 11/2019 He ......................... G06N 3/044
10,885,285 B2 * 1/2021 Och ......................... G06F 40/47

| | | | | |
|---|---|---|---|---|
| 11,995,414 | B1 * | 5/2024 | Vlad ....................... | G06F 40/51 |
| 2001/0029455 | A1 * | 10/2001 | Chin ....................... | G06F 40/58 |
| | | | | 704/277 |
| 2017/0083504 | A1 * | 3/2017 | Huang .................... | G06F 40/40 |
| 2019/0043115 | A1 * | 2/2019 | Purves ................... | G06N 20/00 |
| 2019/0303779 | A1 | 10/2019 | Van Briggle | |
| 2021/0224490 | A1 * | 7/2021 | Guo ....................... | G06F 9/445 |
| 2022/0374614 | A1 * | 11/2022 | Zhang ..................... | G06N 3/08 |

FOREIGN PATENT DOCUMENTS

| | | |
|---|---|---|
| CN | 102799579 B | 1/2015 |
| CN | 114722842 A | 7/2022 |

OTHER PUBLICATIONS

Chen et al., "Improving Translation Faithfulness of Large Language Models via Augmenting Instructions", Cornell University, arXiv:2308. 12674v1, Aug. 24, 2023, 10 pages, <https://arxiv.org/pdf/2308. 12674.pdf>.

(Continued)

*Primary Examiner* — Qamrun Nahar

(74) *Attorney, Agent, or Firm* — Eric W. Chesley

(57) ABSTRACT

A method, computer program product, and computer system are provided for assuring quality of machine translations based on large language models. Data corresponding to an input in a first language is received for machine translation. The received data is translated from the first language to a second language through a translation engine. A confidence value associated with the translated data is determined. The translation is revised with executable source code based on the confidence value being greater than a threshold value. Otherwise, the translation is revised based on sending a prompt to a large language model based on the confidence value being less than the threshold value.

19 Claims, 4 Drawing Sheets

(56) References Cited

OTHER PUBLICATIONS

Lee et al., "IntelliCAT: Intelligent Machine Translation Post-Editing with Quality Estimation and Translation Suggestion", Cornell Univeristy, arXiv:2105.12172v1, May 25, 2021, 9 pages, <https://arxiv.org/abs/2105.12172>.

Mu et al., "Augmenting Large Language Model Translators via Translation Memories", Finding of the Association for Computational Linguistics: ACL 2023, Jul. 9-14, 2023, Toronto, Canada, pp. 10287-10299, <https://aclanthology.org/2023.findings-acl.653.pdf>.

Siu, Sai Cheong, "ChatGPT and GPT-4 for Professional Translators: Exploring the Potential of Large Language Models in Translation", ResearchGate, May 2023, 27 pages, <https://papers.ssrn.com/sol3/papers.cfm?abstract_id=4448091>.

* cited by examiner

100

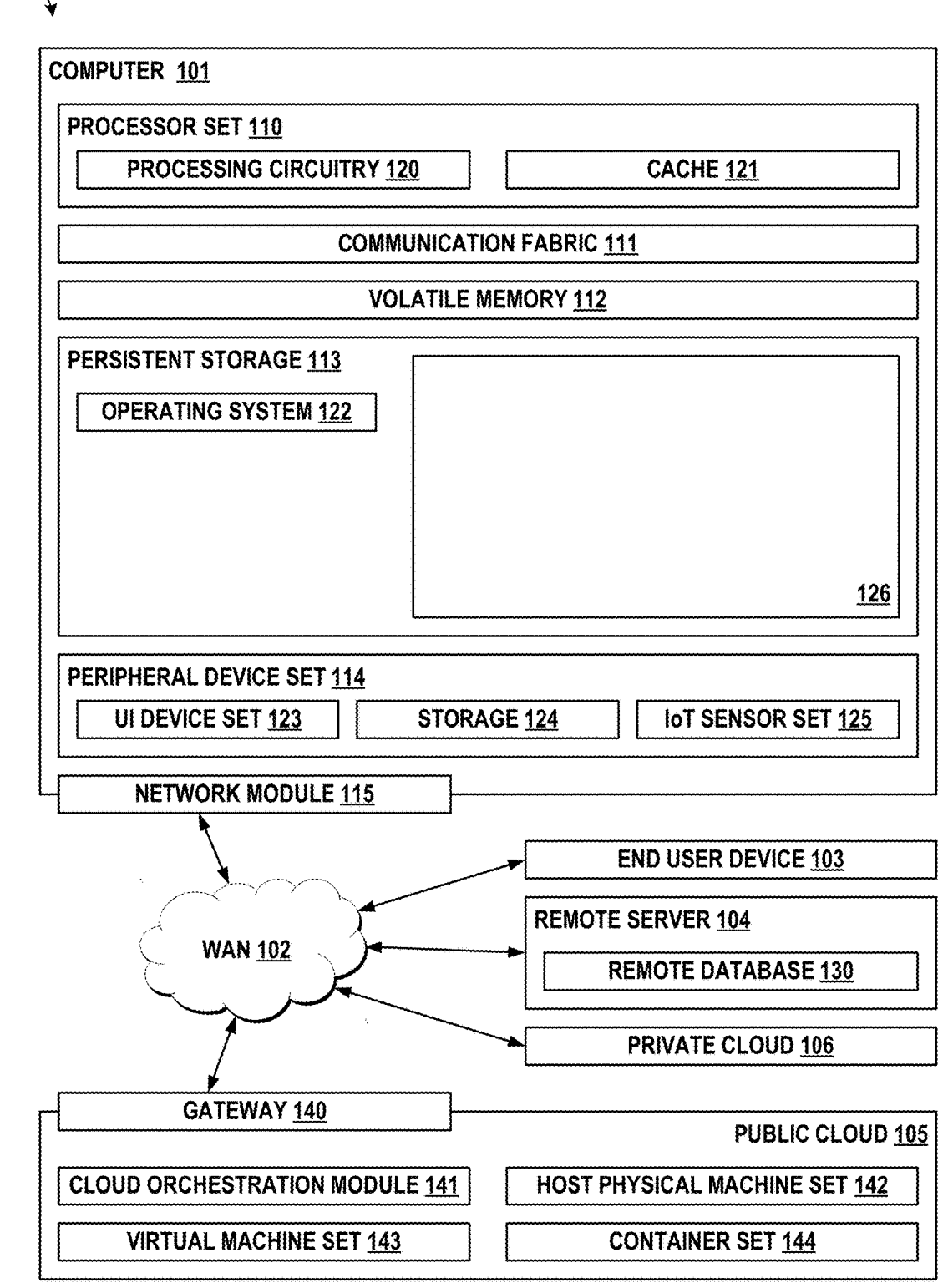

COMPUTER 101

PROCESSOR SET 110

PROCESSING CIRCUITRY 120 CACHE 121

COMMUNICATION FABRIC 111

VOLATILE MEMORY 112

PERSISTENT STORAGE 113

OPERATING SYSTEM 122

126

PERIPHERAL DEVICE SET 114

UI DEVICE SET 123 STORAGE 124 IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 HOST PHYSICAL MACHINE SET 142

VIRTUAL MACHINE SET 143 CONTAINER SET 144

TRANSLATION QUALITY ASSURANCE BASED ON LARGE LANGUAGE MODELS

FIELD

This disclosure relates generally to the field of machine learning, and more particularly to large language models.

BACKGROUND

Machine translation (MT) uses either rule-based or probabilistic machine learning approaches to translate text or speech from one language to another, including the contextual, idiomatic and pragmatic nuances of both languages. Traditionally, machine translation has used statistical methods but has recently adopted neural network-based approaches. Machine translation has been widely used to lower costs associated with translation of textual materials.

SUMMARY

Embodiments relate to a method, system, and computer program product for assuring quality of machine translations based on large language models. According to one aspect, a method for assuring quality of machine translations based on large language models is provided. The method may include receiving data corresponding to an input in a first language for machine translation. The received data is translated from the first language to a second language through a translation engine. A confidence value associated with the translated data is determined. The translation is revised with executable source code based on the confidence value being greater than a threshold value. Otherwise, the translation is revised based on sending a prompt to a large language model based on the confidence value being less than the threshold value.

According to another aspect, a computer system for assuring quality of machine translations based on large language models is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to an input in a first language for machine translation. The received data is translated from the first language to a second language through a translation engine. A confidence value associated with the translated data is determined. The translation is revised with executable source code based on the confidence value being greater than a threshold value. Otherwise, the translation is revised based on sending a prompt to a large language model based on the confidence value being less than the threshold value.

According to yet another aspect, a computer program product for assuring quality of machine translations based on large language models is provided. The computer program product may include one or more computer-readable storage devices and program instructions stored on at least one of the one or more tangible storage devices, the program instructions executable by a processor. The program instructions are executable by a processor for performing a method that may accordingly include receiving data corresponding to an input in a first language for machine translation. The received data is translated from the first language to a second language through a translation engine. A confidence value associated with the translated data is determined. The translation is revised with executable source code based on the confidence value being greater than a threshold value. Otherwise, the translation is revised based on sending a prompt to a large language model based on the confidence value being less than the threshold value.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a networked computer environment according to at least one embodiment;

DETAILED DESCRIPTION

Figure 2:
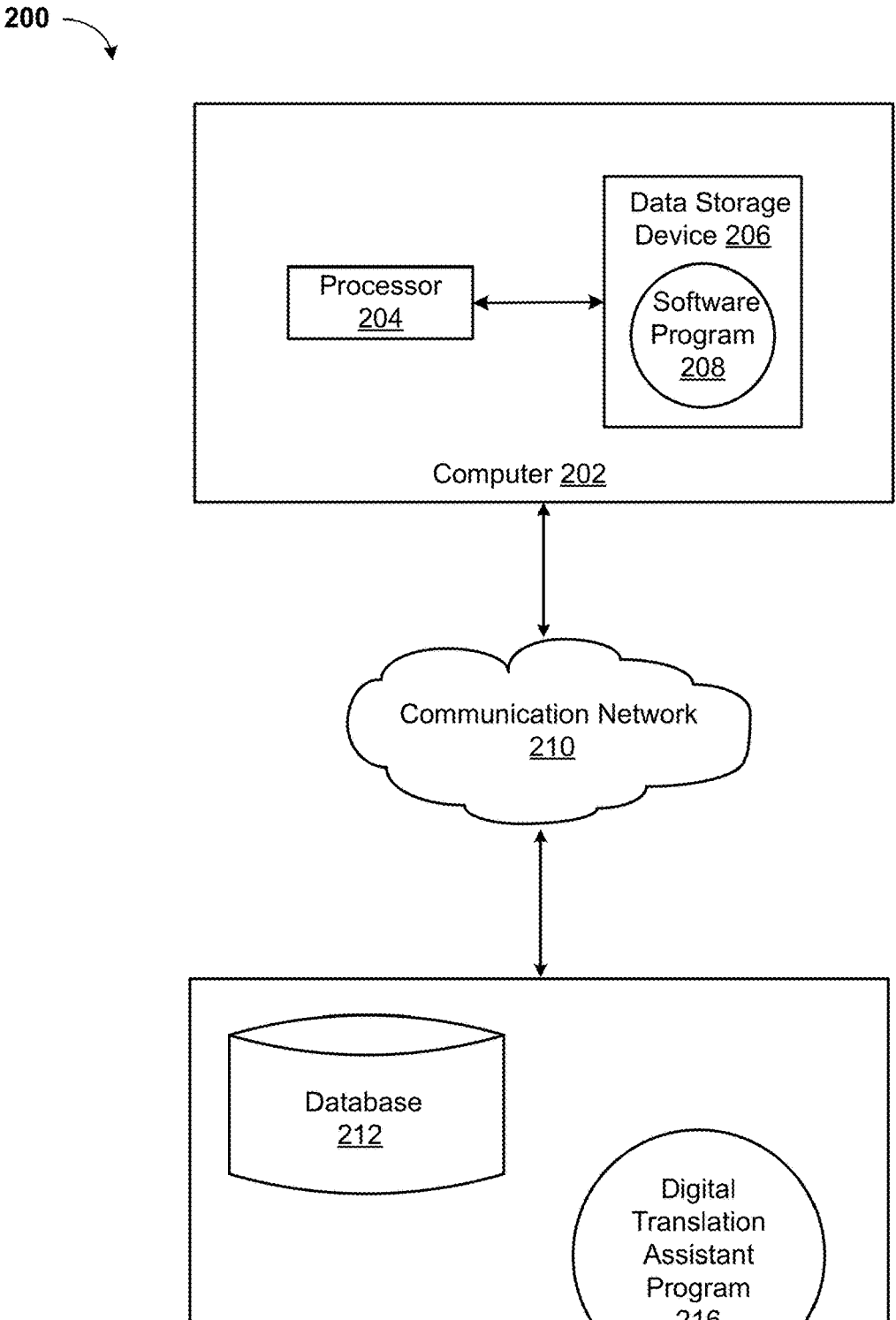
FIG. 2 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of machine learning, and more particularly to large language models. The following described exemplary embodiments provide a system, method, and computer program product to, among other things, ensure the quality of machine translations confidence values using large language models based on confidence values associated with the translation. Therefore, some embodiments have the capacity to improve the field of computing by allowing for machine translation of speech and text while minimizing the need for human post-editing of such translations.

As previously described, machine translation (MT) uses either rule-based or probabilistic machine learning approaches to translate text or speech from one language to another, including the contextual, idiomatic and pragmatic nuances of both languages. Traditionally, machine translation has used statistical methods but has recently adopted neural network-based approaches. Machine translation has been widely used to lower costs associated with translation of textual materials.

However, although machine translation quality is much better now with newer technologies, there are still some scenarios and cases in which machine translation results are not perfect. These may include, among other things, term translation or inline tag related format issues. For machine translation quality issues, human post-editing is one way to achieve a better translation result. However, this is expensive and requires a longer turnaround time. In addition, similar issues will re-occur when new content is translated with same machine translation engine, which may further introduce a poor user experience and increased translation costs.

It may be advantageous, therefore, to use a Large Language Model (LLM) based self-learning and intelligent solution to help improve and guarantee the translation quality, especially for machine translation results. Such solution may allow for auto-collection of low quality translation cases from user tickets or human post-editing history and create groups for different types of translation issues. Self-learning prompts may be composed with pre-defined templates and collected samples, so that verification testing may be used to check and tune the learning effects. Learned knowledge may be converted into executable source code for groups with good learning effects in order to check and improve the source code maturity with regression test. The system may then intelligently select the proper choice for new cases to improve translation quality within reasonable response time.

Thus, the method, computer system, and computer program product disclosed herein may be used to achieve better translation results with less human intervention and lower translation cost. The disclosed method, computer system, and computer program product may handle many translation cases with auto-generated source code, reduce the calls to large language models, mitigate challenges of large language model response latency, and process heavy workloads with acceptable turnaround time. The disclosed method, computer system, and computer program product may support self-serve translation review/correction that may help improve user satisfaction rate and user experience.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program product that improves machine translation based on comparing translation instances needing review to known good translations. Referring now to FIG. 1, Computing environment 100 contains an example of an environment for the execution of at least some of the computer code involved in performing the inventive methods, such as Translation Quality Assurance 126. In addition to Translation Quality Assurance 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Translation Quality Assurance 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Translation Quality Assurance 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Translation Quality Assurance 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating a digital translation assurance system 200 (hereinafter "system") for assuring quality of machine translations based on large language models. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for assuring quality of machine translations based on large language models is enabled to run a Digital Translation Assistant Program 216 (hereinafter "program") that may interact with a database 212. The Digital Translation Assistant Program is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger digital translation assistant program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
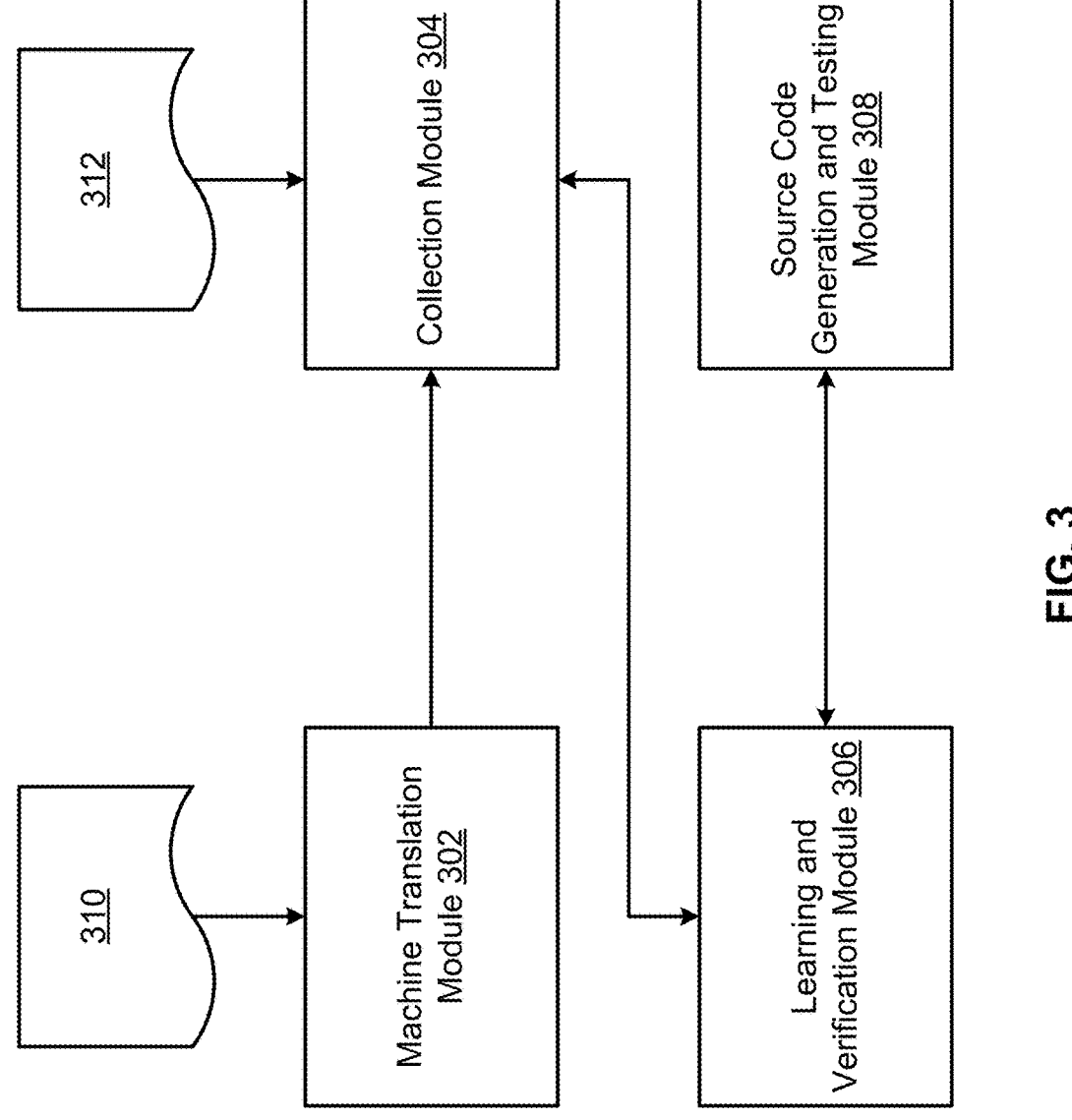
FIG. 3 is a block diagram of a system for assuring quality of machine translations based on large language models, according to at least one embodiment.

Referring now to FIG. 3, a block diagram of a translation assurance system 300 is depicted according to one or more embodiments. The translation assurance system 300 may include, among other things, a machine translation module 302, a collection module 304, a learning and verification module 306, and a source code generation and testing module 308.

The machine translation module 302 may be a translation engine that may translate input translation data 310 from a first language to another. The input translation data 310 may be text or audio data. The machine translation data may receive a translation request from a user of the software program 208 (FIG. 2) on the computer 202 (FIG. 2) or the Digital Translation Assistant program 216 (FIG. 2) on the server computer 214 (FIG. 2).

The collection module 304 may be, among other things, a large language model (LLM) or other machine learning module. The collection module 304 may automatically collect data corresponding to low quality translation cases. For example, the collection module 304 may gather data from user tickets or from post-editing history from human translations. The collection module 304 may, for example, extract an issue description from a user ticket, such as an incorrect word being used in place of a homograph. The collection module 304 may summarize a translation issue by identifying a given translation issue from a user ticket or post-editing history and extract examples including a sentence in a first translation, a reported poor translation, and a user-suggested correct translation based on script template data 312. The collection module 304 may group user tickets and post-edit history data into several categories based on the summarized translation issue.

The learning and verification module 306 may learn from the translation issue data gathered by the collection module 306 in order to determine correct translations for cases needed correction or for which corrected translations have not been provided. The learning and verification module 306 may use the information learned from previous cases to generate a correct translation. Because self-learning may require several iterations, the learning and verification module may determine how many samples may be needed for learning based on verification of the accuracy of the translations. The learning and verification module 306 may verify the accuracy of the translations based on comparing proposed translations to known correct translations in order to determine whether the test case has passed. Based on the testing result, a leaning confidence score may be recorded for each group to indicate if the machine translation module 302 may be able to successfully handle cases in each group. If the verification testing score is lower than a pre-defined threshold value, the learning and verification module may identify a need for more samples to be provided for further learning.

The source code generation and testing module 308 may generate and update source code for use in translation of the input translation data 310. The source code generation and testing module 308 may check corrected translations generated by the learning and verification module 306 and may summarize a generalized set of rules applicable to the corrected translations for generation as source code. The source code generation and testing module 308 may perform regression testing on the generated source code against one or more test cases. Such testing may include, among other things, whether each and every word is translated, appropriateness of punctuation, consistency of spaces, and preservation of special formatting. If the regression testing exceeds a threshold value, the source code is deemed acceptable for use in future machine translations. If the regression testing does not exceed the threshold value, then the source code generation and testing module 308 may be asked to re-generate source code with additional information corresponding to failed translation cases. A score may be recorded for each group's source code.

Thus, by providing several translation examples for digital translation, the translation assurance system 300 may be able to get better machine translation results for new cases. Machine translation users may, therefore, no longer suffer from similar translation issues, and the user experience and satisfaction can be highly improved. For professional translators, the translation assurance system 300 may learn from ongoing post-editing results, auto-apply the learned knowledge, and revise the translations of following segments in order to improve the translation efficiency and consistency during the post-editing process.

Figure 4:
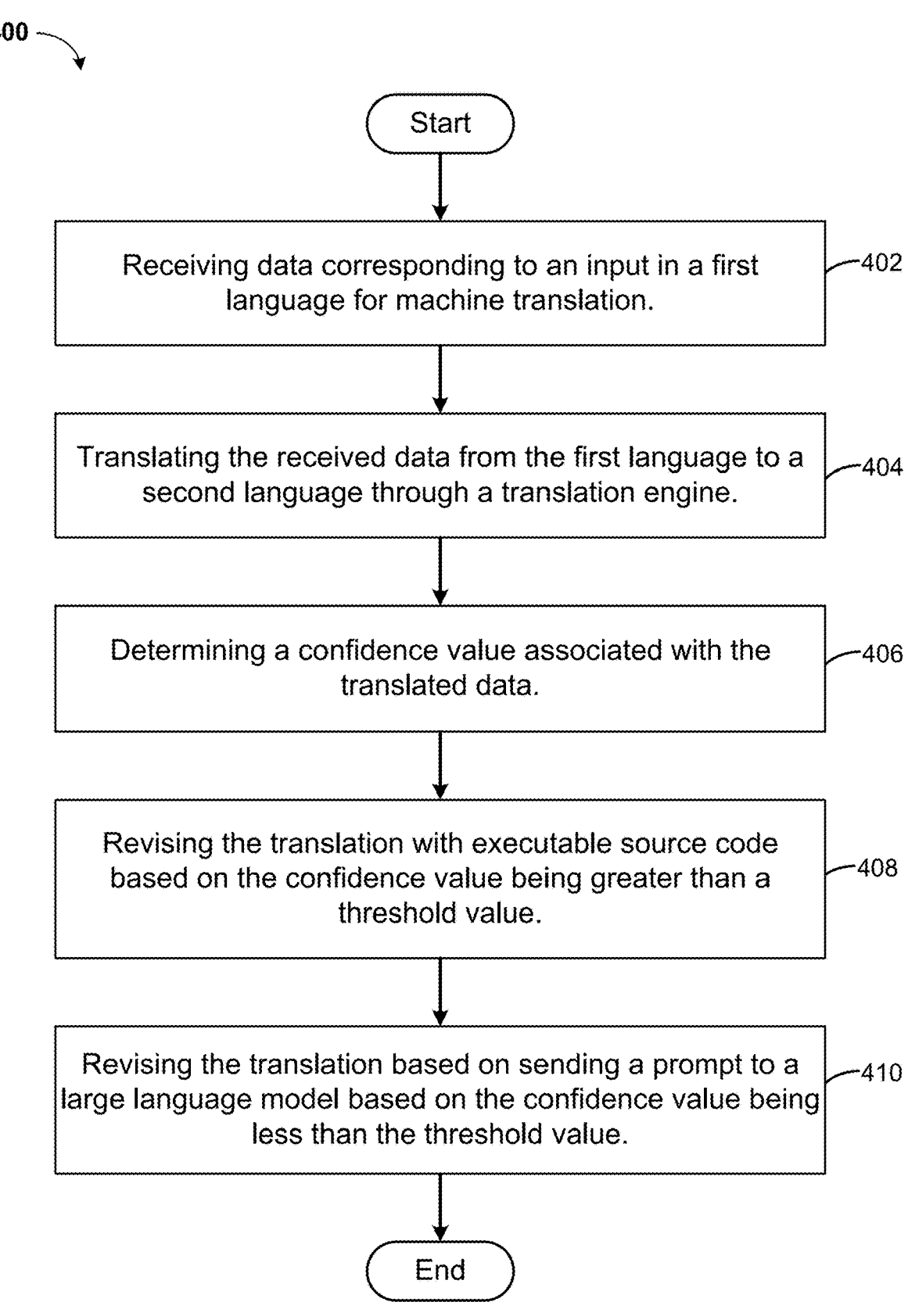
FIG. 4 is an operational flowchart illustrating the steps carried out by a program that assures quality of machine translations based on large language models, according to at least one embodiment.

Referring now to FIG. 4, an operational flowchart illustrating the steps of a method 400 carried out by a program that assures quality of machine translations based on large language models is depicted. The method 400 may be described with the aid of the exemplary embodiments of FIGS. 1-3.

At 402, the method 400 may include receiving data corresponding to an input in a first language for machine translation. The received data corresponds to textual or audio data. In operation, the machine translation module 302 (FIG. 3) may receive input translation data 310 (FIG. 3) from the software program 208 (FIG. 2) on the computer 202 (FIG. 2) or from the Digital Translation Assistant Program 216 (FIG. 2) on the server computer 214 (FIG. 2).

At 404, the method 400 may include translating the received data from the first language to a second language through a translation engine to generate a translation of the received data. The translation engine is updated in response to one or more user tickets corresponding to issues associated with translation of the received data. In operation, the machine translation module 302 (FIG. 3) may translate the input translation data 310 (FIG. 3) to a new language. The collection module 304 (FIG. 3) may gather cases of poor translation from the machine translation module 302 and may pass information on such cases, along with user tickets and post-editing history data, to the learning and verification module 306 (FIG. 3) in order to train the machine translation module 302.

At 406, the method 400 may include determining a confidence value associated with the translated data. The translation engine is trained based on comparing one or more translation cases identified for review with one or more known correct translations based on confidence values associated with the threshold value. Comparing the one or more translation cases identified for review with the one or more known correct translations corresponds to determining whether confidence values for the one or more translation cases identified for review and the one or more known correct translations are greater than the threshold value. In operation, the collection module 304 (FIG. 3) may gather cases of poor translation and group them into one or more groups. The learning and verification module 306 (FIG. 3) may compare the groups to known good translation cases in order to improve the translation quality of the machine translation module 302 (FIG. 3).

At 408, the method 400 may include revising the translation with executable source code based on the confidence value being greater than a threshold value. The source code is updated based on the trained translation engine. In operation, the source code generation and testing module 308 (FIG. 3) may revise the source code based on a confidence value associated with the quality of source code translation being less than a pre-determined threshold value. The source code generation and testing module 308 may pass this source code to the machine translation module 302 (FIG. 2) for improving quality of translation of the translation input data 310 (FIG. 3).

At 410, the method 400 may include revising the translation based on sending a prompt to a large language model based on the confidence value being less than the threshold value. A second confidence value associated with the revising of the translation based on sending the prompt to the large language model is determined. A need for human post-editing is identified based on the second confidence value being less than a second threshold value. In operation, the source code generation and testing module 308 (FIG. 3) may determine that the quality of even the source code translation may be insufficient and may pass the translation of the input translation data 310 (FIG. 3) to a large language model for improving the translation.

It may be appreciated that FIG. 4 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of assuring quality of machine translations based on large language models, executable by a processor, comprising:
   receiving data corresponding to an input in a first language for machine translation;
   translating the received data from the first language to a second language through a translation engine to generate a translation of the received data;
   determining a confidence value associated with the translated data;
   revising the translation with executable source code based on the confidence value being greater than a threshold value, wherein the executable source code is automatically generated for the translation engine; and
   updating the translation engine with the executable source code.

2. The method of claim 1, further comprising:
   determining a second confidence value associated with the revising of the translation based on sending a prompt to the large language model; and
   identifying a need for human post-editing based on the second confidence value being less than a second threshold value.

3. The method of claim 1, further comprising revising the translation based on sending a prompt to a large language model based on the confidence value being less than the threshold value.

4. The method of claim 1, wherein the translation engine is trained based on comparing one or more translation cases identified for review with one or more known correct translations based on the confidence values associated with the threshold value.

5. The method of claim 4, wherein comparing the one or more translation cases identified for review with the one or more known correct translations corresponds to determining whether the confidence values for the one or more translation cases identified for review and the one or more known correct translations are greater than the threshold value.

6. The method of claim 5, further comprising updating the executable source code based on the trained translation engine.

7. The method of claim 1, wherein the translation engine is updated in response to one or more user tickets corresponding to issues associated with translation of the received data.

8. A computer system for assuring quality of machine translations based on large language models, the computer system comprising:
   a processor set;
   one or more computer-readable storage media; and program instructions stored on the one or more computer-readable storage media to cause the processor set to perform operations comprising:

receiving data corresponding to an input in a first language for machine translation;

translating the received data from the first language to a second language through a translation engine to generate a translation of the received data;

determining a confidence value associated with the translated data;

revising the translation with executable source code based on the confidence value being greater than a threshold value, wherein the executable source code is automatically generated for the translation engine; and updating the translation engine with the executable source code.

9. The computer system of claim 8, wherein the program instructions stored on the one or more computer-readable storage media further comprises:

determining determine a second confidence value associated with the revising of the translation based on sending a prompt to a large language model; and identifying a need for human post-editing based on the second confidence value being less than a second threshold value.

10. The computer system of claim 8, further comprising revising the translation based on sending a prompt to a large language model based on the confidence value being less than the threshold value.

11. The computer system of claim 8, wherein the translation engine is trained based on comparing one or more translation cases identified for review with one or more known correct translations based on the confidence values associated with the threshold value.

12. The computer system of claim 11, wherein comparing the one or more translation cases identified for review with the one or more known correct translations corresponds to determining whether the confidence values for the one or more translation cases identified for review and the one or more known correct translations are greater than the threshold value.

13. The computer system of claim 12, wherein the program instructions stored on the one or more computer-readable storage media further comprises updating code configured to cause the one or more computer processors to update the executable source code based on the trained translation engine.

14. The computer system of claim 8, wherein the translation engine is updated in response to one or more user tickets corresponding to issues associated with translation of the received data.

15. A computer program product for assuring quality of machine translations based on large language models, comprising:

one or more computer-readable storage devices; and program instructions stored on at least one of the one or more computer-readable storage devices, the program instructions configured to cause one or more computer processors to:

receive data corresponding to an input in a first language for machine translation;

translate the received data from the first language to a second language through a translation engine to generate a translation of the received data;

determine a confidence value associated with the translated data;

revise the translation with executable source code based on the confidence value being greater than a threshold value, wherein the executable source code is automatically generated for the translation engine, and the translation engine is updated with the executable source code; and revise the translation based on sending a prompt to a large language model based on the confidence value being less than the threshold value.

16. The computer program product of claim 15, wherein the program instructions stored on the at least one of the one or more computer-readable storage devices are further configured to cause the one or more computer processors to:

determine a second confidence value associated with the revising of the translation based on sending the prompt to the large language model; and identify a need for human post-editing based on the second confidence value being less than a second threshold value.

17. The computer program product of claim 15, further comprising revising the translation based on sending a prompt to a large language model based on the confidence value being less than the threshold value.

18. The computer program product of claim 15, wherein the translation engine is trained based on comparing one or more translation cases identified for review with one or more known correct translations based on the confidence values associated with the threshold value.

19. The computer program product of claim 18, wherein comparing the one or more translation cases identified for review with the one or more known correct translations corresponds to determining whether the confidence values for the one or more translation cases identified for review and the one or more known correct translations are greater than the threshold value.

* * * * *